United States Patent Office 3,204,170
Patented Aug. 31, 1965

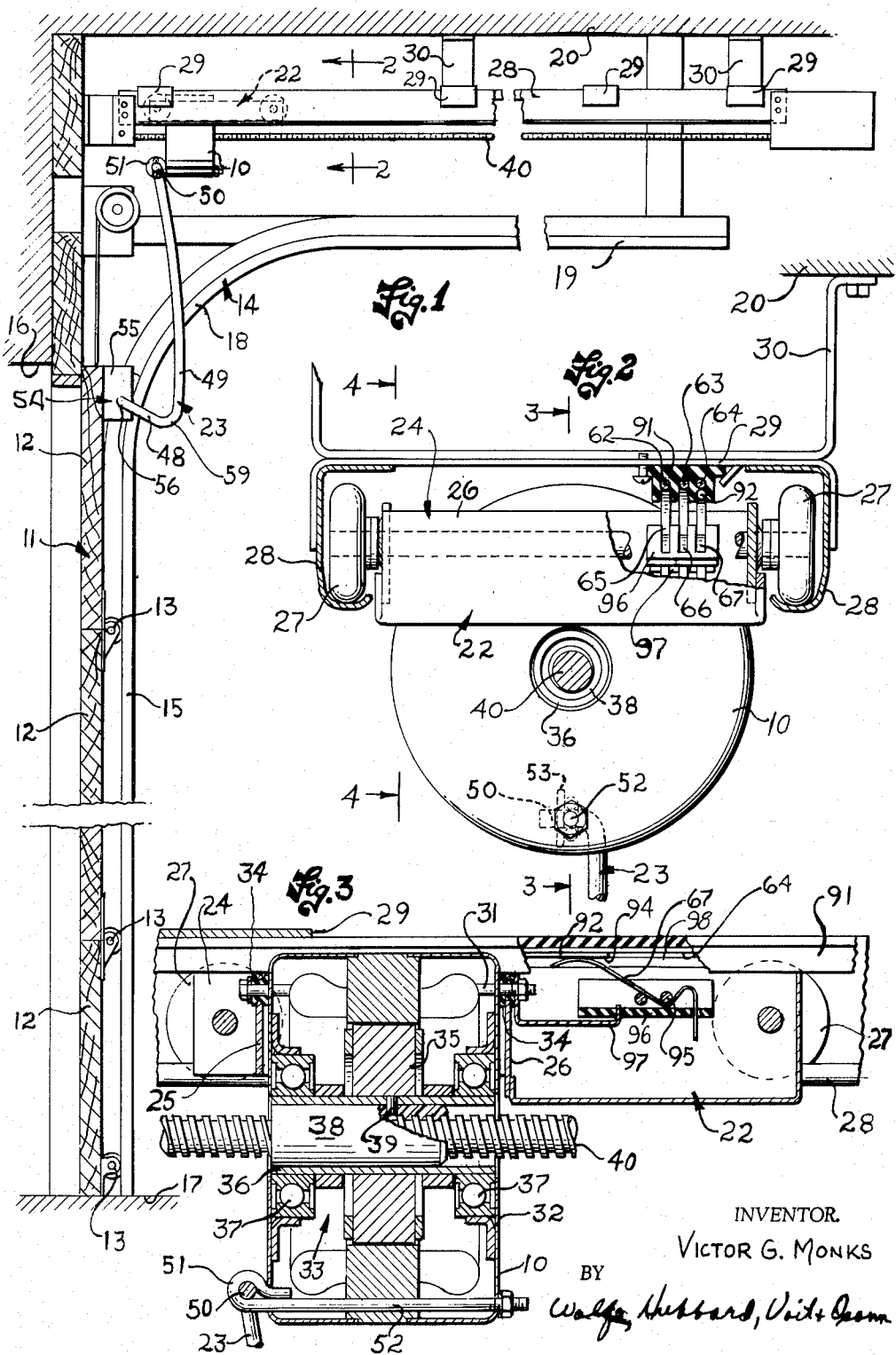

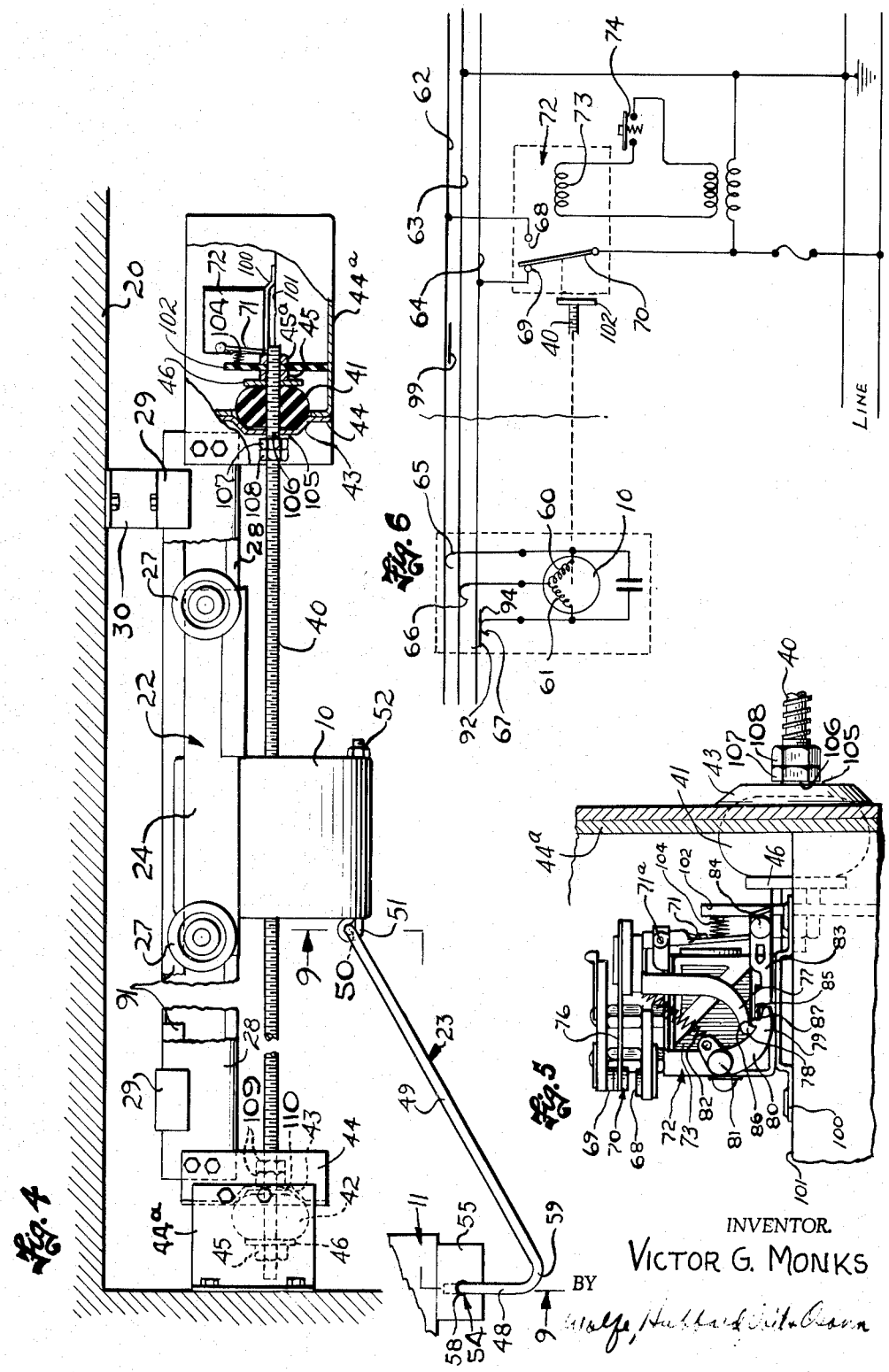

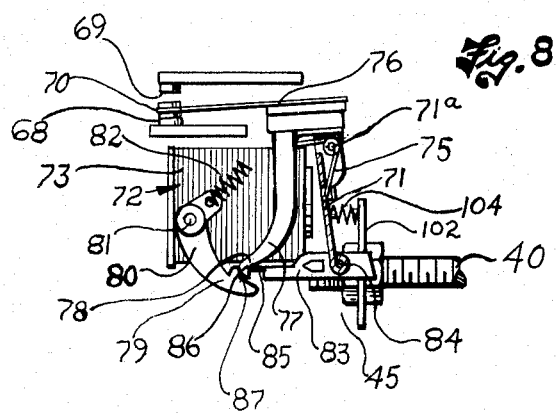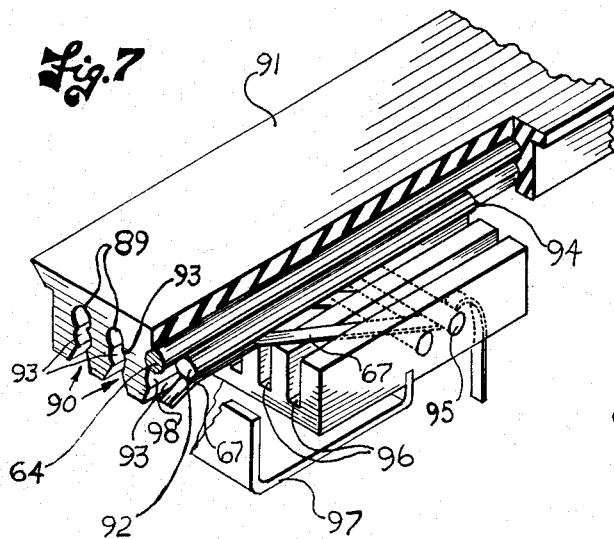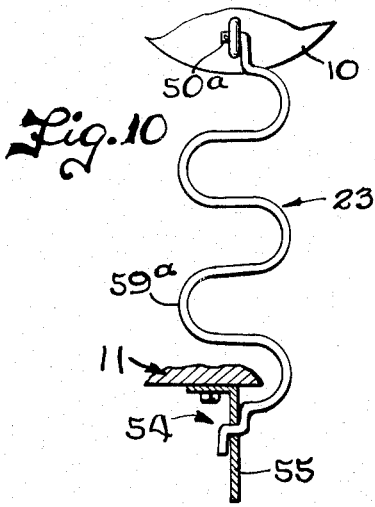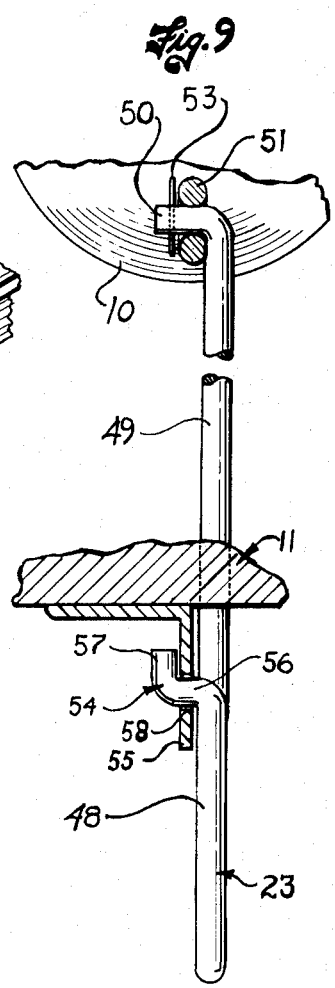

3,204,170
TRAVELING MOTOR DOOR OPERATOR
Victor G. Monks, Rockford, Ill., assignor to Barber-Colman Company, Rockford, Ill., a corporation of Illinois
Filed Oct. 1, 1962, Ser. No. 227,210
2 Claims. (Cl. 318—267)

This invention relates to any electric motor driven operator for sliding closures such as building doors, particularly those of the upwardly sliding type.

The general object is to reduce substantially the cost of construction and installation of such an operator while at the same time achieving durability of construction and smoother and quieter operation even when the actuated closure is not balanced accurately.

Another object is to achieve the cheapness in construction by coupling the closure directly to the motor casing which is moved back and forth along a stationary screw threaded through a nut in the hollow shaft of the motor.

A further object is to utilize the endwise yielding of the screw when an obstruction is encountered by the door to stop and reverse the motor.

Still another object is to carry current to the motor through stationary bus bars coacting at their ends in a novel manner with associated brushes to form limit switches for controlling the operation of the motor.

A further object is to transmit the force derived from operation of the motor to the door through a one-piece, yieldable link of novel construction.

Other objects and advantages of the invention will become apparent from the following detailed description taken in connection with the accompanying drawings, in which FIGURE 1 is a fragmentary vertical sectional view of a building door opening adapted to be opened and closed by a door reciprocated back and forth by a power operator embodying the novel features of the present invention, the door being in closed position.

FIG. 2 is a fragmentary section taken along the line 2—2 of FIG. 1.

FIG. 3 is a fragmentary section taken along the line 3—3 of FIG. 2.

FIG. 4 is a view similar to FIG. 1 with the door open, the parts being shown in section along the line 4—4 of FIG. 2.

FIG. 5 is an enlarged fragmentary view of a portion of FIG. 4 and showing the construction of the relay for controlling the motor cycles.

FIG. 6 is a schematic view and a circuit diagram.

FIG. 7 is a fragmentary perspective view of the bus bar and brush construction.

FIG. 8 is a view similar to FIG. 5 showing another position of the relay parts.

FIG. 9 is a fragmentary section taken along the line 9—9 of FIG. 4.

FIG. 10 is a fragmentary sectional view similar to FIG. 9 showing a modification.

In the drawings, the invention is shown for purposes of illustration incorporated in an operator driven by an electric motor 10 for opening and closing a door 11 composed of panels 12 pivotally connected together by hinges 13 and slidable along laterally spaced tracks 14. In the closed position (FIG. 1), the door is disposed in upright sections 15 of the tracks secured to the door frame 16, the lower edge of the door being pressed against the floor 17. In the opening cycle, the panels slide upwardly around curved sections 18 of the track into an open position in which the panels are disposed in horizontal or overhead sections 19 suspended from rigid brackets depending from the ceiling or other support 20.

Movement of the door between open and closed position is effected by reciprocating a carriage 22 back and forth along the ceiling and pivotally coupled to the upper edge of the door by a link 23. Herein the carriage comprises a box-like frame 24 having front and rear cross plates 25, 26 on which rollers 27 are journaled at the corners to ride in laterally spaced tracks 28 on the depending flanges of a channel 29 rigidly suspended from the ceiling by brackets 30 and having a length greater than the range of movement of the door. The motor 10 is mounted directly on the carriage 22 so as to travel back and forth therewith. Herein two of the angularly spaced tie bolts 31 of the motor extend through the casing 32 and stator 33 of the motor and rubber grommets 34 seated in holes in cross-bars 25 atnd 26 of the carriage and clamping the casing to the carriage. The grommets permit some degree of yielding of the motor relative to the carriage thus reducing the transmission of vibration to the carriage and the tracks 28.

Conversion of the rotary motion of the rotor 35 to reciprocation of the motor and carriage is achieved by a stationary screw 40 and rotating nut mechanism 38 extending along the axis of the motor whose shaft comprises a tube 36 journaled in bearings 37 on the stator and telescoped around the nut 38 pinned at 39 or otherwise secured to the tube. The nut is preferably composed of a material such as nylon impregnated with a lubricant such as graphite so as to possess a slight degree of yieldability in transmitting the motor torque to the screw.

The screw or worm 40 threads through the nut and is substantially longer than the stroke of the carriage. It is preferably supported at opposite ends in blocks 41 and 42 of resiliently yieldable material such as firm rubber clamped in sockets 43 on cross plates 44 of housings 44ª fixed to opposite ends of the track 28. Nuts 45 threaded onto opposite ends of the screw clamp the rubber blocks 41 between the sockets 43 and abutment washers 46. To hold the screw positively against turning the inner end of the screw extends through a hole in a square washer 102 (FIG. 4) securely clamped by a nut 45ª against the nut 45 with one edge disposed close to the bottom of the housing 44ª. The rubber mountings not only hold the screw substantially stationary during normal opening and closing of the door but also coact with the resilient material of the nut 38 and the motor supports 34 to absorb vibrations due to sixty-cycle motor hum, roughness or binding in the guides for the door, etc. Because of this and the use of the screw and nut as the sole motion converting device, the opening and closing of the door is effected more quietly and smoothly than has been possible heretofore. As will appear later, the resilient mounting of the screw performs still another function.

With the arrangement above described, the turning of the rotor 35 will be converted into rectilinear motion of the carriage at a speed determined by the motor speed and the pitch of the screw. The required force for raising and lowering an ordinary garage door using a quarter-horse power motor will be produced with a screw pitch that will produce torque amplification of about twenty.

The link 23 for transmitting the carriage motion to the door is of special construction to provide some degree of longitudinal yielding so as to insure tight abutment of the door when closed against the floor 17 in spite of dimensional inaccuracies between the floor 17 and the track 19 in the original installation or later changes in this dimension for any cause. To this end, the link 23 is made as a single piece of resilient wire bent intermediate its ends 50 and 54 in a manner such that it is resiliently collapsible endwise in response to an increase in the compressive force applied along a line extending through these ends. For these purposes, the wire forming the link in the form shown in FIGS 1, 4 and 9 is bent into a J-shape having short and long legs 48 and 49 disposed at about 60 degrees relative to each other as shown in FIG. 4 when the link is free. Herein the leg 49 is several times as long as the short leg. To provide for quick disconnection of the carriage from the door and facilitate manual movement of the latter after a power failure, a right angular end portion 50 of the long leg is extended through an eye 51 formed on one end of a third and lowermost tie bolt 52 of the motor 10 and held in the eye by an easily removable snap type clip 53 pressed through a hole in the rod end beyond the eye.

The end 54 of the short leg 48 of the J is pivotally connected to a lug 55 secured to the upper edge of the door on the back thereof in a way which facilitates quick disconnection of the link from the door. For this purpose and as shown in FIG. 9, the end portion of the leg is bent first laterally and at right angles as indicated at 56 to form a pivot pin and then back into parallelism with the leg proper as indicated at 57. The latter may be pushed endwise through a hole 58 in the lug after which the link is swung through 90 degrees to dispose the crosspiece 56 within the hole of the lug and thus connect the link pivotally to the door.

The forward or door-closing stroke of the carriage is terminated as shown in FIG. 1 with the pivot 50 between the link 23 and the eye 51 disposed almost in vertical alinement with the pivot 56 between the link and the door. In this position, the carriage exerts through the link a downward force on the door which is directed along a line including the pivots 50 and 56 and offset from the apex or bend 59 of the J so as to tend to collapse the latter laterally and thereby shorten the link in the event that the door comes against the floor 17 before the carriage 24 reaches its foremost position. In this way, substantial leeway is allowed in mounting the screw on the ceiling and spacing the same relative to the floor. Also, normal variations in the floor are accommodated automatically by longitudinal yielding of the link to allow the carriage to advance forwardly to the predetermined door-losing position shown in FIG. 1.

In another of its aspects, the invention contemplates a simple and inexpensive construction of bus bars for conducting electric current to the windings 60, 61 for operation of the motor in opposite directions and also to constitute the contacts of switches by which the opposite limits of reciprocation of the carriage are determined. To provide two circuits, three bus bars 62, 63 and 64 cooperate with the curved ends of brushes 65, 66 and 67 respectively connected to the common and the line terminals of the motor windings. The bus bar 63 is connected to one terminal of an alternating current power source while the bars 62 and 64 are connected to the line terminals of switches 68 and 69 which, when closed, effect energization of the windings 60 and 61 to initiate door-opening and closing cycles of the motor. The common contact 70 of the switches 68, 69 is coupled to the armature 71 of a so-called detent type relay 72 in such a way that the switches 68 and 69 are closed alternately in response to successive energizations of a magnet 73 of the relay produced by successive closures of a manually operable switch 74.

As shown in FIGS. 5 and 8, the magnet armature 71 is pivoted at 71ª and urged away from the magnet to the position shown by a spring 75 coiled around the pivot. A spring arm 76 also fulcrumed on the pivot 71ª carries at its free end the common contact 70 of the two switches. An arm 77 fixed at one end near the pivoted end of the spring arm projects along the armature and at its free end is formed with a pawl 78 adapted to bear against a projection 79 (FIG. 8) on the free end of arm 80 fulcrumed at 81. A spring 82 stretched between the arms 77 and 80 urges both arms to maintain contact between the two. A plunger 83 suspended at 84 from the free end of the armature 71 is adapted at its free end 85, and upon successive movements of the armature, to enter notches 86 and 87 in the pawls 78 and 79 and cause the switch arm to be swung back and forth and close the switches 69 and 68 respectively. Thus, the switch 69 will be closed as shown in FIG. 5 at the end of a door-closing cycle, the tip of the pawl 78 being disposed to the left of the tip of the pawl 79. After termination of the door-opening cycle, the parts will be disposed as shown in FIG. 8 with the pawl 78 disposed to the right of the pawl 79 thus, in effect, latching the switch 68 closed. Such latching between the pawls 78 and 79 results in the relay parts and switch contacts being moved with a detent action to the positions shown in FIG. 5 to initiate a door-closing cycle of the motor 10 in response to one energization of the magnet 73 and to the positions shown in FIG. 8 to initiate a door-opening cycle in response to the succeeding energization of the magnet winding.

A unique construction and mounting of the bus bars 62, 63, 64 enables these bars to cooperate with the brushes 65, 66, 67 to form switches for deenergizing the motor at the desired limits of movement of the door. For this purpose, the bars comprise lengths of wire fitting tightly in and slid endwise into holes 89 at the bottoms of grooves 90 molded in a bar 91 of insulation which is secured within the channel 29 above the carriage 22 (see FIG. 2) with the grooves opening downwardly and the bus bars paralleling the screw 40. The bars are longer than the desired maximum stroke of the carriage. To form a limit switch for terminating the door closing cycle, a short rod 92 of insulating material such as nylon is slid into and along a hole 93 in the bar 91 with its end 94 terminating at the point where it is desired to deenergize the motor and terminate the closing cycle.

The bus bar 64 is engaged by the arcuate free end of the brush 67 which is composed of resilient metal and which projects upwardly into a downwardly opening groove 98 through which the bar 94 is exposed. The brush is mounted cantilever fashion as shown in FIG. 3 on a cross pin 95 and the bottom of an insulating channel 96 which is secured to the free end of a resilient plate 97 fastened by the bolt 31 to the rear end of the carriage 22. The plate is stressed to urge the channel 96 upwardly and hold the brushes in contact with the bus bar and also the brushes 65 and 66, which are similarly mounted, in contact with their respective bus bars 62 and 63. An insulating rod 99 (FIG. 6) similar to the rod 92 is slid into a hole in the bar 91 to cover the bar 62 to the point at which the motor is to be deenergized to terminate the door-opening cycle. The brush 66 which is connected to the common terminal of the motor windings remains in contact with the bus bar 63 in all positions of the carriage 22.

It will be apparent that at the end of the door-closing cycle, the brush 67 encounters and rides over the end 94 of the rod 92 thus interrupting the circuit through the closing winding 61, the motor then coasting to a stop with the brush positioned as shown in FIGS. 3 and 6. Then, when the start switch 74 is again closed, the relay is energized completing the circuit through the brush 65 and the bus bar 62 to energize the winding 60. The carriage is retracted and the door raised until the brush rides onto the insulating rod 99 thus stopping the motor. It will be observed that either limit of the carriage stroke may be adjusted as desired simply by sliding one of the insulating rods 92 or 99 along the associated holes 93 and the associated bus bar.

Advantage is taken of a characteristic of a screw and nut combination yieldably mounted through the blocks 41 as above described and also of the detent character of the relay 72 to sense the obstruction of the door during a closing cycle and automatically reversing the motor to return the door to fully open position. For this purpose, the base 100 of the relay is secured to a bracket 101 in the housing 44a with the armature 71 extending transversely of the screw 40 and spaced a short distance behind the upper edge portion of the washer 102 as shown in FIGS. 4 and 5. The space is spanned by a coiled or flat spring 104 (FIG. 8) fixed to the washer with its free end normally disposed close to the armature 71. Now, when the door in closing encounters an obstruction, the resulting overload on the screw and nut shifts the screw rearwardly as permitted by yielding of the rubber block under the increased compression. This motion is transmitted by the spring 104 to mechanically swing the armature 71 toward the magnet thus shifting the parts of the relay to the positions shown in FIG. 8 thereby opening the switch 69 and closing the switch 68. Thus the motor is reversed instantly to raise the door and return the same to the open position.

To avoid damaging the relay, the extent of such endwise yielding of the rubber block and movement of the screw is limited positively to a narrow range 105 for example 1/16 to 1/8 of an inch. Herein this is accomplished by an abutment 106 formed by a nut 107 threaded onto the screw adjacent the bottom of the socket 43 at the inner end of the screw. A nut 108 serves to lock the abutment in the desired position of adjustment.

Preferably, a similar pair of nuts 109 are threaded onto the forward end of the screw adjacent the socket 43 and provide an abutment 110 which limits the forward shifting of the screw to a range somewhat less than the range 105. By limiting the endwise shifting of the screw in both directions, the abutments 106 and 110 coact with the rubber mountings to eliminate objectionable endwise vibration of the screw thus providing for extremely smooth operation.

The desired resilient collapsibility of the link 23 to accommodate dimensional variations in the installation as above described may be achieved by bending the single piece of resilient wire into different shapes. For example, as shown in FIG. 10, bent back and forth zigzag fashion thus providing a plurality of bends or loops 59a which are individually collapsible laterally in response to endwise compression of the link between the ends 50a and 54a.

Through the use of the nut and stationary screw mounted and coupled to the motor and the door as above described, it will be apparent that an exceedingly compact and simple construction has been provided thus eliminating the gearing, chains, belts, etc. and their mountings heretofore employed in most door operators. The same construction and the yieldable mountings contribute to extremely smooth and vibrationless operation while providing a simple way of reversing the door as soon as an obstruction is encountered. The simple bus bar and limit switch construction also contributes to the substantial reduction in manufacturing cost.

I claim as my invention:

1. A power actuator of the character described having, in combination, a carriage mounted for back and forth movement along a predetermined path between spaced limit positions, a reversible electric motor having a tubular shaft fixed to said carriage with its axis extending along said path, means coupling said carriage and motor to a part to be reciprocated, an elongated screw extending through said hollow shaft along said path, two bodies of resiliently yieldable material enclosing and secured to opposite ends of said screw, stationary means supporting said bodies to permit some degree of axial yielding of said screw when said actuated part encounters an obstruction, switch mechanism controlling the operation of said motor in opposite directions to move said motor and carriage back and forth along said screw and stop the motor with the actuated part in the respective limit positions, selectively operable means to initiate successive cycles of said motor to move the actuated part toward said limit positions, and means responsive to endwise shifting of said screw when an obstruction is encountered by said actuated part in traveling in one direction and operable through said switch mechanism to reverse said motor and transfer the control thereof to said switch mechanism for continuing operation of the motor in such reverse direction until said part reaches one of said limit positions.

2. A power actuator of the character described having, in combination, a carriage mounted for back and forth movement along a predetermined path between spaced limit positions, a reversible electric motor fixed to said carriage with its axis extending along said path, a rotary member mounted on said carriage and driven by said motor, said member having a helical thread, an elongated screw extending along said path and mating with said thread, means resiliently supporting said screw and holding the same against turning while permitting some degree of axial yielding of the screw when said carriage encounters an obstruction while traveling in one direction, means controlling the operation of said motor in opposite directions to move said motor and carriage back and forth along said screw between said limit positions including first, second and third parallel and stationary bus bars insulated from each other and extending along said path, the exposed surfaces of said first and second limit control bars terminating at positions corresponding to said limit positions, insulated brushes yieldably urged against said three bars, a circuit for running said motor in one direction and interrupted when one of said brushes moves beyond the exposed surface of its associated limit control bus bar, a second circuit for running said motor in the opposite direction and interrupted when another of said brushes moves beyond the exposed surface of its limit control bus bar, selectively controllable means for reversing the connections between said motor and said first and second bus bars whereby to initiate operation of the motor and movement of said carriage in a corresponding direction, and means responsive to said axial shifting of said screw when an obstruction is encountered by said carriage to cause the connection between said motor and limit control bus bars to be reversed whereby to initiate reverse rotation of the motor and continue such operation to the limit determined by the then active limit control bus bar.

References Cited by the Examiner

UNITED STATES PATENTS

| | | | |
|---|---|---|---|
| 2,595,291 | 5/52 | Ramsey | 318—466 |
| 2,747,863 | 5/56 | Huppert et al. | 318—282 |
| 2,824,623 | 2/58 | Nord et al. | 318—267 |
| 2,991,403 | 7/61 | Groft | 318—266 |
| 3,002,140 | 9/61 | Bonner | 318—267 |
| 3,012,520 | 12/61 | Curtis | 318—266 |
| 3,021,131 | 2/62 | Bornemann | 268—59 |
| 3,048,385 | 8/62 | Reynolds | 268—59 |
| 3,084,318 | 4/63 | Lind | 318—266 |

ORIS L. RADER, *Primary Examiner.*